Patented Aug. 11, 1942

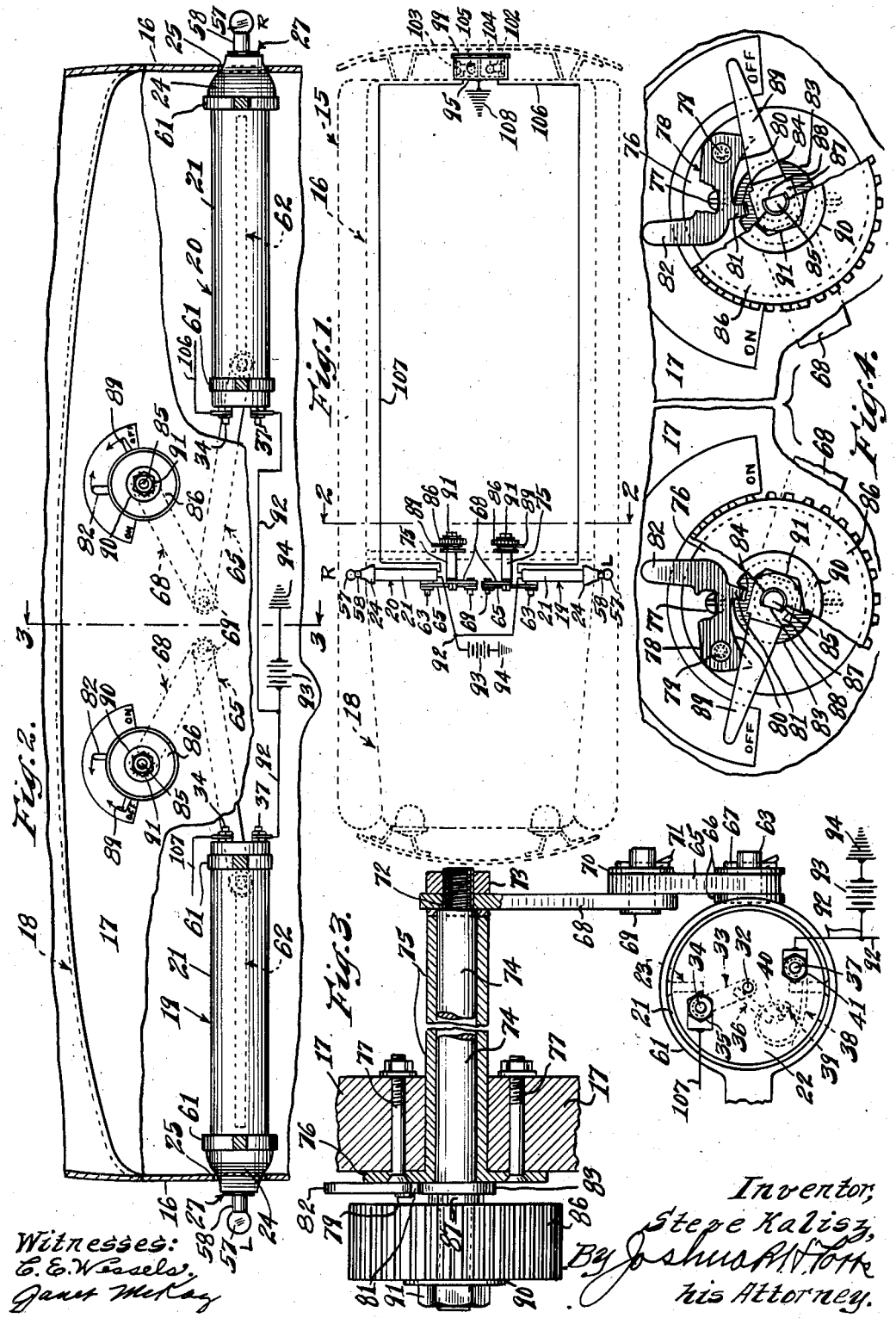

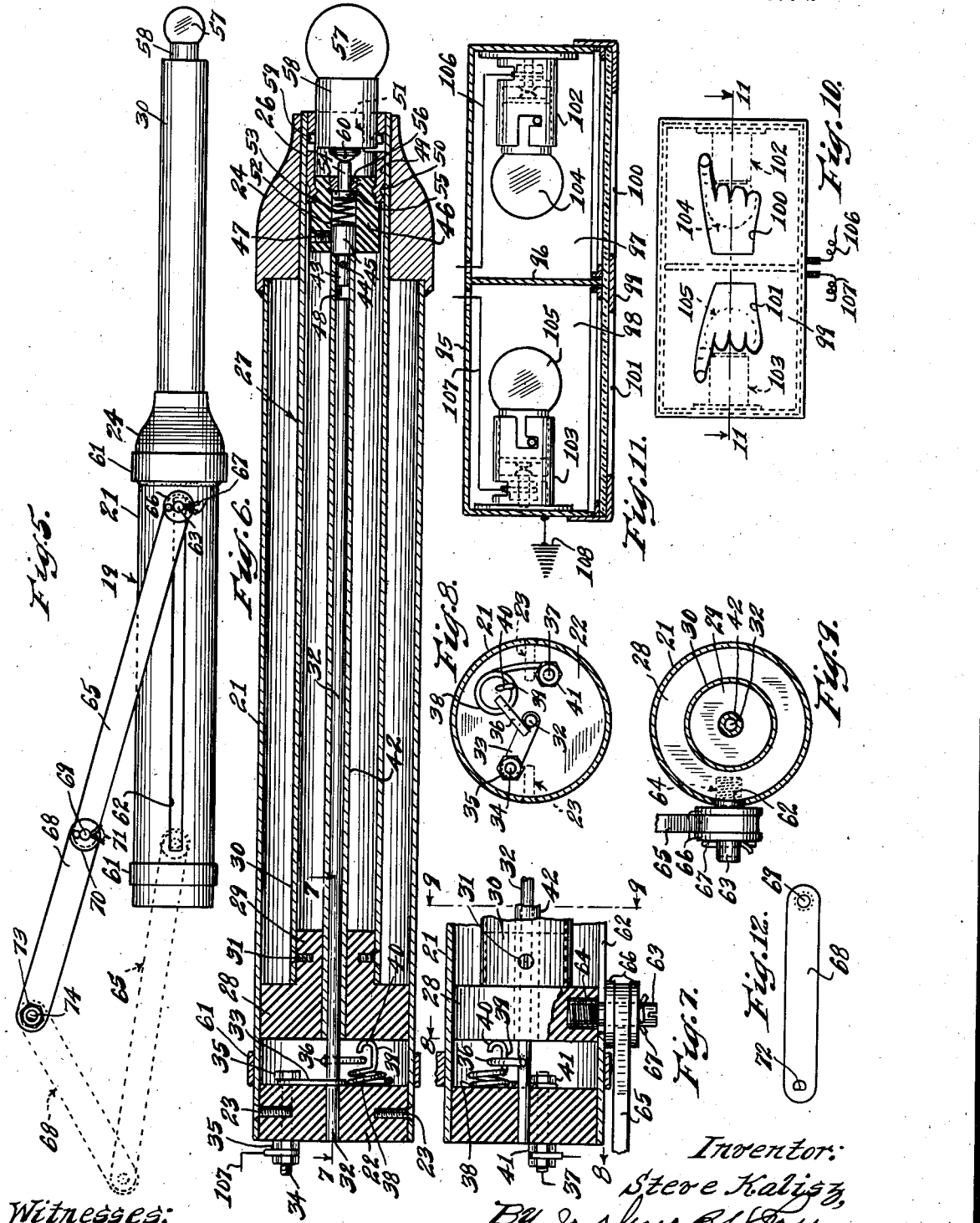

2,292,698

UNITED STATES PATENT OFFICE 2,292,698

DIRECTION INDICATOR FOR AUTOMOBILES

Steve Kalisz, Chicago, Ill.

Application November 14, 1939, Serial No. 304,376

5 Claims. (Cl. 116—50)

My invention relates to direction indicators for vehicles, especially automobiles or auto signals for indicating the direction, either right or left, in which the vehicle, such as an automobile, is about to be turned so that other drivers and pedestrians will be warned in advance and be able to control their movements accordingly so as to facilitate traffic control and avoid accidents.

The principal object of the invention is to provide an auto signal which will give an indication at the sides and front of a car, as well as at the rear, and in which the side and front signals are easily operated by the driver at the front and independently extensible and retractable at both sides to obviate the necessity of a driver or passenger extending an arm or hand from the sides of the car and which often results in injury from being struck by other vehicles.

Another object of the invention is to provide a retractable signal arm having a signal light which is automatically extinguished when the arm is retracted and which can be readily operated to be manually projected and at the same time close an electric circuit to a signal light especially for use after dark, without detracting the driver's attention from the steering wheel.

Still another object of the invention is to greatly simplify the structure and operation and to provide novel means for holding the right and left hand signals in extended or retracted positions and to indicate the respective positions thereof at the operating means so that it will not be necessary for the driver to detract his attention from the operation of the vehicle.

Other objects and advantages will appear hereinafter and be brought out more fully in the following specifications, reference being had to the accompanying drawings, wherein:

Fig. 1 is a diagrammatic view of the auto signal applied to a car shown in dotted lines;

Fig. 2 is an enlarged cross section taken on line 2—2 of Fig. 1;

Fig. 3 is a vertical section taken on the line 3—3 of Fig. 2;

Fig. 4 is an enlarged fragmentary face view of the operating means partly broken away;

Fig. 5 is an elevation showing the left hand signal extended and looking toward the rear;

Fig. 6 is a longitudinal section of one of the signals in retracted position;

Fig. 7 is a plan section on the line 7—7 of Fig 6;

Fig. 8 is a cross section on the line 8—8 of Fig. 7;

Fig. 9 is a cross section on the line 9—9 of Fig. 7;

Fig. 10 is a face view of the rear signals;

Fig. 11 is a section on the line 11—11 of Fig. 10; and

Fig. 12 is a face view of a link forming part of the device.

Referring more particularly to the drawings to illustrate the construction and operation of the invention, there is shown a car or automobile 15 or a vehicle having a body 16, a dash or cowl 17 and a hood 18, it being understood that the vehicle has the usual steering standard or post and steering wheel in front of the driver in the usual manner, but which have been omitted from the drawings for the sake of clearness. There are two side operating units or signals which also serve for signals on the front of the car, the left hand signal unit being designated at 19 and the right hand signal unit at 20. Each signal or unit comprises an elongated cylinder 21 supported in a horizontal position on the dash 17 or otherwise and the two being in horizontal alignment and spaced apart at their inner ends. A plug 22 in the form of a block or disk of insulation such as hard rubber, Bakelite or other dielectric material is secured in the inner end of each cylinder in any suitable way such as by screws 23 and the opposite or outer end of each cylinder is closed by a tapered cap 24, soldered, welded or otherwise secured on the cylinder. The tapered ends of the caps 24 project through openings 25 in the sides of the body 16 under the dash 17 so as to remain in position and each cap has a reduced bore 26 relative to the bore of the cylinder 21 forming an end shoulder at the inner end of the cap.

A plunger unit 27 is movable in each cylinder and comprises a plunger head 28 snugly fitting in and movable within the cylinder 21 and having a reduced portion 29 on which an inner smaller tube or cylinder 30 is fixed as by screws 31. An axial guide rod 32 is rigidly secured in a central opening in the fixed plug 22 and has a radial plate or arm 33 fixed thereto and connected at its outer end to a binding post 34 extending through the plug 22 and held by nuts 35, the axial guide 32 forming a rigid conductor extending through the major portions of the lengths of the cylinders 21 and 30, but terminating short of the outer end of the cylinder 21 and the inner end of the cap 24. The guide 32 has a fixed radial arm 36 forming a contact spaced from the inner face of the plug 22 and positioned preferably at obtuse angled or intersecting relation to the arm 33. An insulated binding post 37 is provided through the plug 22 diametrically opposite the binding post 34 and has one end of an arm on a spring 38 coiled around it to anchor the spring. The free end of the spring has a laterally and axially bent spring arm 39 forming a part of the inner helix or coil adjacent to but spaced from the arm 36 and a laterally bent hook 40 at its inner end extending toward the arm 36 for engagement by the plunger head 28 so that expansion of the spring 38 normally causes it to engage with the arm 36 forming contacts or a switch for an electrical circuit automatically operated by the extension and retraction of a signal arm as will be later described. The binding post 37 is held by nuts 41.

An axial guide tube conductor 42 telescopically receives the rod conductor 32 and is anchored at one end in the plunger 28 through which the rod extends and terminates at its outer end inwardly of the adjacent or outer end of the cylinder 21 and in spaced relation to a reduced shank 43 which is held in the end of the tube as by a pin 44, the shank being formed as a reduced portion of a short plug 45 and forming a shoulder against which the adjacent cuter end of the tube 42 extends or abuts with the tube 42 projecting beyond the rod 32 and the outer end of the cylinder 21. An insulation sleeve 46 forming a head, is mounted on the plug 45 and held by a set screw 47 extending through the sleeve and engaging the plug to move with the tube 42 while leaving a space 48 between the shank 43 and the end of the rod 32 to allow compression and expansion of the spring contact 38 as will be later described. A socket shell 49 snugly fits in the tube or cylinder 30 and is fixed to a reduced portion of the enlarged sleeve 46 as by indentations or burs 50 and has bayonet slots 51. The bore 52 of the sleeve 46 receives an expansible coil spring 53 and a contact pin 54 having an enlargement in the form of a base flange 55 engages the spring and is held from displacement by a nut 56. A lamp bulb 57, which may be colored red or otherwise to attract attention, has its base 58 received in and electrically contacting socket shell 49 and provided with lugs 59 to engage the bayonet slots 51 and a contact 60 to engage the contact 54 and due to the compression of the spring 53 to hold the bulb in position as well as to effect positive electrical connection.

Clamping rings 61 or other form of brackets are fitted around the cylinder 21 to mount the same on and in back of the dash 17 and each cylinder has a longitudinal slot 62 receiving an extension post or radial stud shaft 63 extending from the plunger 28, and preferably threaded in a socket in said plunger as at 64. A link 65 is pivoted to the post 63 between opposed washers 66 and held by suitable means, such as a cotter pin 67. A link 68 is pivoted to the link 65 as at 69 in the form of a headed pin with a retaining washer 70 and a cotter pin 71. As compared with the free end of the link 65 to which the link 68 is pivotally connected, the free or other end of the link 68 has a hole 72 with a flat side and is held by a nut 73 on and fits the end and flat side of the threaded end of a shaft 74 which is rotatably mounted in a bearing sleeve 75 provided with a fixed flange 76 at its inner end fastened to the dash 17 as by bolts 77. This provides an articulated connection between the post 63 on the plunger 28 and the shaft 74. An angular locking dog 78 is pivoted at 79 on the apertured plate or flange 76 and has a tapered end with a concaved side 80 and an intermediate lug 81 while the angular end 82 projecting beyond the periphery of the plate forms an operating finger piece. A fixed flange 83 of annular form is provided at the inner end of the squared or flattened end portion of the shaft 74 and has a notch 84 over which the tapered end and concaved side 80 is adapted to ride, but is designed to be engaged by the lug 81 to hold the shaft 74 against turning when the signal is extended, or retracted, if desired. The end of the shaft 74 having a flattened side portion 85 has a knurled operating wheel 86 mounted thereon and the wheel has a sleeve 87, the bore of which has a flat side 88 which fits the flat side portion 85 of the shaft 74 to fix the wheel against rotation relative to the shaft. The wheel or sleeve carries a pointer 89 projecting outwardly of the periphery of the wheel to indicate right or left or in and out position when the signals are retracted or extended with suitable markings on the dash such as "off" and "on" cooperating therewith as shown in Figs. 2 and 4. A washer 99 is mounted on the shaft as well as a locking nut 91 to retain the wheels 86 in position.

Lead wires 92 extend from the posts 37 and connect to a battery 93 grounded as at 94 and this may be the battery of the car.

The back or rear signals comprise a box or case 95 divided by a partition 96 into two compartments being a right compartment 97 and a left compartment 98. The back of the box is open and has a cover plate 99 with right and left hand pointers 100 and 101 shown as a hand with the index finger extended and pointing in opposite directions and suitably backed by red or other colored glass or corresponding panel of transparent or translucent material which may be Celluloid, isinglass or some fire-proof material or plastic. Corresponding electric bulb sockets 102 and 103 are suitably mounted in the compartments 97 and 98 respectively to receive light bulbs 104 and 105. A lead 106 extends from one post 34 to the right hand socket 102 and a lead 107 extends from the other post 34 to the left hand socket 103, while the case is grounded to the frame of the car as at 108. Of course, the source of electrical energy or current may be from the usual starting, ignition and lighting battery of the car or from a generator.

In the operation of the device, assuming that the automobile is traveling along a road, street or highway, and it is desired to make a turn, either from one lane to another or to the right or left at an intersecting street or road, ordinary slight deflections in straight way travel excepted, the driver merely releases the locking dog 78 of the right or left hand signal by means of a finger piece 82, thus disengaging the lug 81 thereof from the corresponding notch 84. The pointer 89 is normally at the off position when the indicator arm, plunger, or signal is retracted and by turning the operating wheel and its shaft in the proper direction, clock-wise for the left hand signal and counter-clockwise for the right hand signal, the arm or link 68 fixed to the shaft 74 will be swung from the dotted line position shown in Figs. 2 and 5 to the full line position shown in Fig. 5, thus moving the link 65 outwardly and in line with the arm 68. During this movement the end of the link 65 connected to the stud shaft 63 will rotate on the latter and move the plunger 28, together with its cylinder 30 outwardly thus projecting the latter and the illuminating means carried thereby to extend beyond the side of the car body. During this movement the tube 42 will slide over the rod 32 and while not ordinarily necessary since only about a half turn of the shaft 74 is necessary to operate the device in this manner, when the pointer reaches the "on" position further turning is stopped. When the plunger 28 is in, as shown in Figs. 6 and 7, it engages the end 40 of the spring contact 38 and compresses the latter to disengage the same from the contact arm 36 to break the circuit. However, when the device is projected and the plunger 28 moved away from the spring contact 38 the latter will expand to engage a coil with the contact 36 and close the circuit through the supply source together with the contact rods 32 and 42 to the bulb. The space 48 allows the necessary play between the parts to insure engagement of the plunger with the end 40 of the spring contact 38 and compression of the latter before the shank 43 engages the rod 32 so that the switch formed thereby will be opened by compression of the spring 38 out of engagement with the stationary or fixed radial contact arm 36 thus permitting the spring to expand and close the circuit when this pressure is released. In connection with the wire conductors and the switch thus described formed by the pairs of contacts in the manner described, the bulbs will be extinguished when the devices are retracted, but will be illuminated when they are projected, either in advance or at the time of making a turn in either direction so that the traffic may be regulated accordingly.

When the circuit is closed to either bulb 36, designating a right or left hand turn, the corresponding pointer at the back will also be illuminated to facilitate traffic regulation. By reason of the construction described, the device may be economically manufactured and easily installed and since it operates positively, insofar as the side and front signals are concerned, there is nothing to get out of working order, such as when valves or pistons operate hydraulically, such as by vacuum pressure or suction, created in the intake manifold of an automobile engine.

The device is positive and quick in operation and may be easily operated by the driver in advance of making a turn so that the likelihood of collisions or accidents may be avoided and without detracting the driver's attention from the steering and operation of the auto.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent, is:

1. In an automobile direction signal for indicating direction of turning, an extensible signal arm having a stationary portion and a slidable portion, rotatable means operating through the stationary portion and connected to the slidable portion for extending and retracting the slidable portion, a notched member carried by the rotatable means and a locking dog pivoted to a stationary part and cooperating with the notched member to hold the slidable portion of the signal arm in one position.

2. A signal including an extensible arm, rotatable means for projecting the arm, an operating member for said means, an apertured stationary member having a plate and a tube supporting the rotatable means, a notched member carried by the rotatable means and a locking dog pivoted to the plate and having a projection engaging the notched member to hold the arm in one position and having a projection beyond the stationary member and a concaved side adapted to ride over the notch.

3. In a direction indicator, a slidable signal arm adapted to be projected or retracted, a plate adapted to be secured to a dash and having an aperture and a bearing sleeve projecting from the plate at the aperture through the dash, a shaft rotatable in the aperture and sleeve, an articulated connection between the shaft and the arm for sliding the arm to projected or retracted positions upon turning the shaft, means for turning the shaft and a pivoted dog carried by the plate and a notched member rotatable with the shaft in cooperative relation for engagement by the dog to hold the arm in at least one position.

4. A signal comprising an extensible arm, a shaft rotatably mounted, a link fixed to one end of the shaft, a link pivoted to the free end of the first link and having its opposite end pivotally connected to the extensible arm, a stationary arm in which the extensible arm is slidable and having a slot in which said connection is slidable together with the extensible arm, a stationary member supporting the shaft, an operating member on the shaft and cooperating means rotatable with the shaft and pivoted means on the stationary member for holding the arm in an adjusted position.

5. A signal including an extensible arm having a stationary portion and a slidable portion, rotatable means for projecting the extensible portion, an operating member for said means, a stationary member supporting said means, a notched member carried by said means, a locking dog cooperating with the notched member to hold the arm in an adjusted position and having a projection beyond the stationary portion and a concaved side adapted to ride over the notch.

STEVE KALISZ.